Ludwig W. Blau Inventors
Louis Statham
By W. F. Weigester Attorney

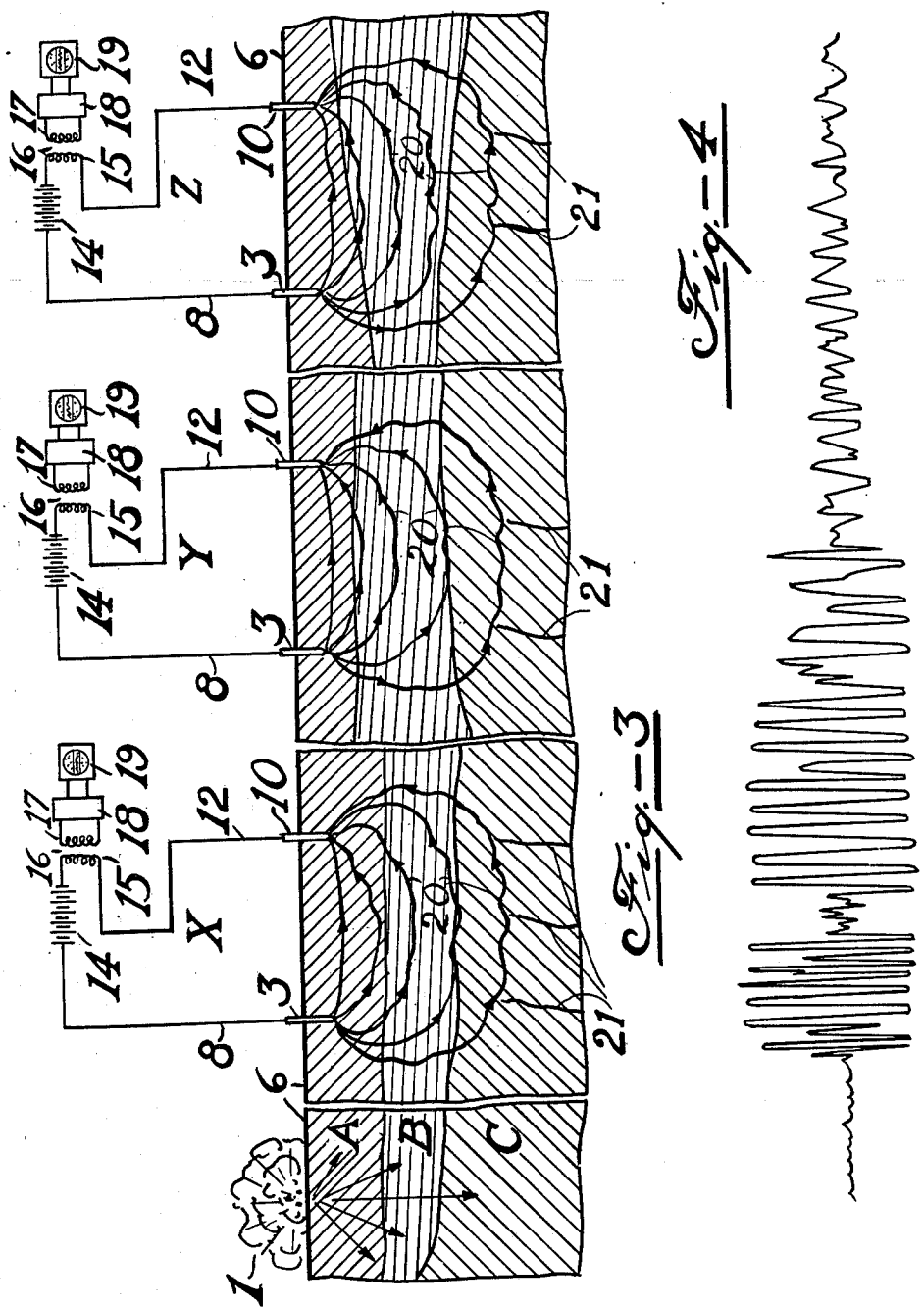

Patented Sept. 15, 1936

2,054,067

UNITED STATES PATENT OFFICE 2,054,067

METHOD AND APPARATUS FOR SEISMIC-ELECTRIC PROSPECTING

Ludwig W. Blau and Louis Statham, Houston, Tex., assignors to Standard Oil Development Company, a corporation of Delaware Original application December 14, 1932, Serial No. 647,084. Divided and this application December 27, 1934, Serial No. 759,348

28 Claims. (Cl. 181—0.5)

This invention relates to seismic-electric prospecting. More particularly it relates to the use in seismic prospecting of the effect of seismic waves upon the electric constants of the ground.

This application is a division of our co-pending application Serial No. 647,084 entitled "Method and apparatus for seismic prospecting", filed December 14, 1932.

In seismic prospecting as previously practiced, vibrations are sent out from some source and recorded after refraction, reflection, etc., at boundary surfaces by means of seismographs located at any desired distance from the source. In prospecting for oil, explosions of dynamite are commonly used to generate the vibrations. It is well known that earthquake shocks, both artificial and natural, are composed of several types of vibrations or waves. The first waves to arrive at the seismograph are longitudinal waves in which the particles vibrate in the direction of propagation of the wave. The transverse waves arrive next. In the transverse waves the particles vibrate in a plane perpendicular to the direction of propagation. The so-called Rayleigh and Love waves are still slower than the transverse waves. In seismology, and especially in reflection shooting, only times of arrival of the longitudinal waves are used by the observer, but the reflections arriving after the direct longitudinal waves are in general so distorted by the transverse waves, if these are not eliminated, so as to make their identification impossible. It is in many cases possible to eliminate or at least reduce the intensity of the transverse waves since they are low frequency waves. In many areas, however, the higher frequencies of the longitudinal waves are absorbed leaving only their low frequency components. Any device or arrangement previously used which will eliminate or reduce the low frequency transverse waves will also eliminate or reduce the low frequency components of the longitudinal waves. Hence, if in such cases the high frequencies are absorbed nothing or very little is left of the reflections. Therefore transverse waves cannot be eliminated by mechanical, acoustical or electrical filters in such areas.

The seismograph obtains an indication of the actual motion of the ground on which a detector of small dimensions is placed. The average seismograph customarily used has a diameter of about three inches. Such a seismograph is responsive to wave energy arriving over the area of the seismograph, say ten square inches or less.

It is an object of this invention to obtain an integrated effect due to seismic waves propagated through a large volume of the crust of the earth. Another object is to provide an improved method and apparatus for cancelling out different waves; that is waves of different types and wave lengths for sufficient lengths of time to permit of the clear recording of reflections.

Other objects will be apparent from the specification and from the accompanying drawings in which latter—

Fig. 3 is a vertical sectional view through the ground showing a preferred arrangement of a plurality of receiving stations with respect to the shotpoint;

Fig. 4 shows a typical record obtainable through the use of the invention;

Figure 1:
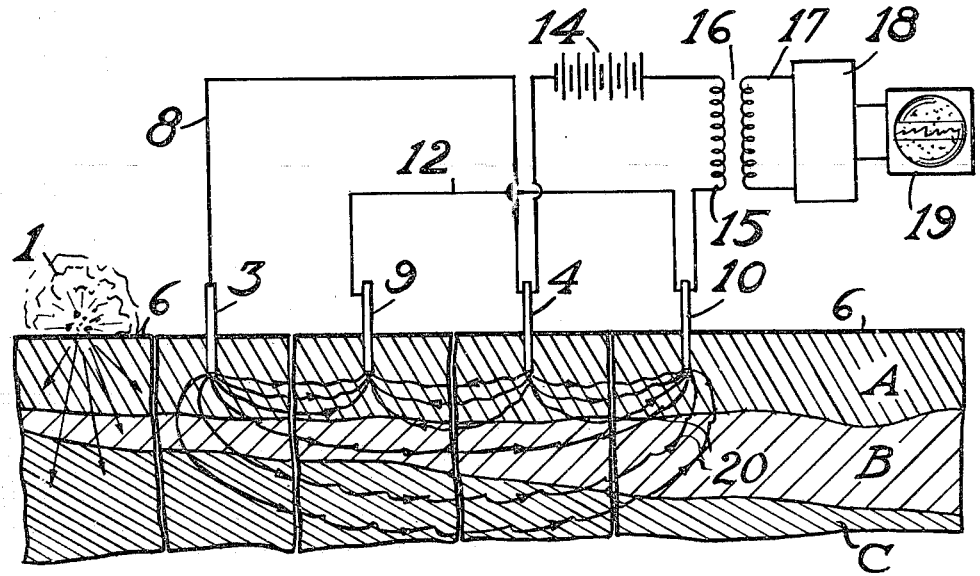
Fig. 1 is a diagrammatic view of a preferred form of apparatus for carrying out the invention.
Figure 2:
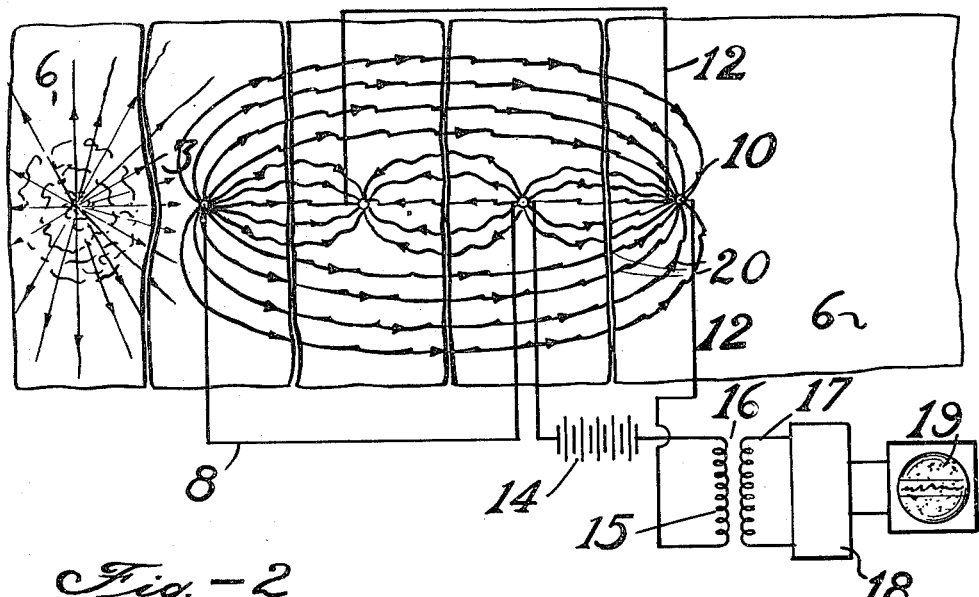
Fig. 2 is a top plan view of the apparatus illustrated in Fig. 1.

Referring particularly to Figs. 1 to 4 inclusive of the drawings, reference numeral 1 designates the shotpoint or source of disturbance of seismic waves. Reference numerals 3 and 4 are electrodes which extend into the surface of the ground 6 in spaced relation to each other and to the source 1 of seismic disturbance. The electrodes 3 and 4 are connected in parallel by means of an electrically conductive line 8. Similarly electrodes 9 and 10 disposed in the surface of the ground 6 in spaced relation to each other and to the source 1 of seismic energy are connected in parallel by means of an electrically conductive line 12. Electrodes 3, 4, 9 and 10 may be non-polarizing or otherwise. A battery 14 is connected in series with the primary 15 of a transformer 16 and with the electrodes. The secondary 17 of the transformer 16 is connected to an appropriate amplifier 18. The outlet leads of the amplifier 18 are connected to an oscillograph 19. Any even number of electrodes can be used if desired, such as two or more. The battery 14 causes a flow of direct current through the ground between the electrodes 3, 4, 9 and 10 thereby producing lines of electric force which approximately parallel the lines 20. Some of these lines of force pass through the surface layer A directly between the electrodes. Other lines of force pass through the subsurface strata B and C.

Preferably a plurality of receiving stations designated X, Y and Z in Fig. 3 are provided at different distances from the shotpoint and the effects of the seismic disturbance at the different stations are recorded simultaneously.

In the operation of the device, a seismic disturbance caused by an explosion, falling weight or the like changes the electrical resistance of the ground between the electrodes. The change in resistance causes a variation in the electrical current passing through primary 15 of the transformer. This variation is impressed upon the amplifier 18 by the secondary 17 of the transformer and is finally recorded by the oscillograph 19. If desired, the battery or other source of electrical energy 14 can be omitted. The natural electrical ground current of the ground 6 which is recorded by the oscillograph 19 is changed by the seismic disturbance. This change in the natural ground current is recorded by the oscillograph.

The electrodes may be separated by any suitable distance from each other and from the source 1 of seismic disturbance. Consequently it is possible to utilize the energy due to the seismic disturbance arriving over a considerable area. The reaction recorded by the oscillograph is due to something which has happened to the electric current lines, either naturally or artificially, on the passage of seismic waves through the volume or cubic contents of the earth's strata through which these electric currents are flowing. Thus the direct wave and the surface waves which travel substantially along the surface of the earth 6 modify these current lines for a relatively long time and therefore give a very weak indication at the oscillograph or no indication at all, as compared with reflected waves 21, see Fig. 3, arriving substantially in a vertical direction from below which therefore modify or affect the electric current lines almost simultaneously over the whole volume. By way of specific example, the electrodes 3 and 4 may be disposed 100 feet apart from the electrodes 9 and 10. In such a case the current intensity at a depth of about 50 feet is quite appreciable. The electric current lines then assume the form of a hemisphere with a radius of fifty feet. This hemisphere then has a volume of approximately 250,000 cubic feet and the seismic waves affect the electric current lines throughout this volume of the ground. An indication is therefore obtained due to seismic energy received inside of a very great volume of the ground, whereas in using a seismograph, as previously practiced, the indications due to seismic energy are received merely over a surface.

In using this method there is recorded at the oscillograph the instant of explosion of the charge and the time interval is used between the explosion and a characteristic deflection on the record. To correlate these time intervals with deep reflecting horizons, a time depth curve is determined by setting up the receiving station near a well, not shown, at the surface of the ground and by exploding dynamite charges at different depths in the well. The time intervals are relatively short.

By the procedure described an indication is obtained of a vertically traveling wave 21 before the wave arrives at the surface 6 of the earth because the current lines 20 penetrate below the surface. In the preferred procedure, the electrodes are separated to such a distance that the current lines penetrate below the low velocity layer A. This is quite easy because the layers below the low velocity layer have a relatively high conductivity and also carry a relatively large natural ground current as compared with the low velocity layer. Thus many of the effects of the low velocity layer A are eliminated.

Referring to Fig. 4, a record is shown which was obtained in prospecting an area in which the low velocity layer was only a few feet thick. The electrodes were disposed 25 feet apart. The record shows the integrated effect of the seismic waves arriving in the large volume through which the current passed. The record shows the arrival of the reflected waves free from the low frequency waves and without the use of an electrical wave filter to eliminate the undesirable low frequency waves. The record gives an indication of the wave before the wave arrives at the surface of the ground. The integrated effect begins while the wave is still at some depth below the surface of the ground.

While the invention has been described as recording changes in the electrical resistance of the ground, it will be understood that variations due to a seismic disturbance in the capacity or inductance may be utilized and such variations are included in the scope of the applicants' invention.

Figure 5:
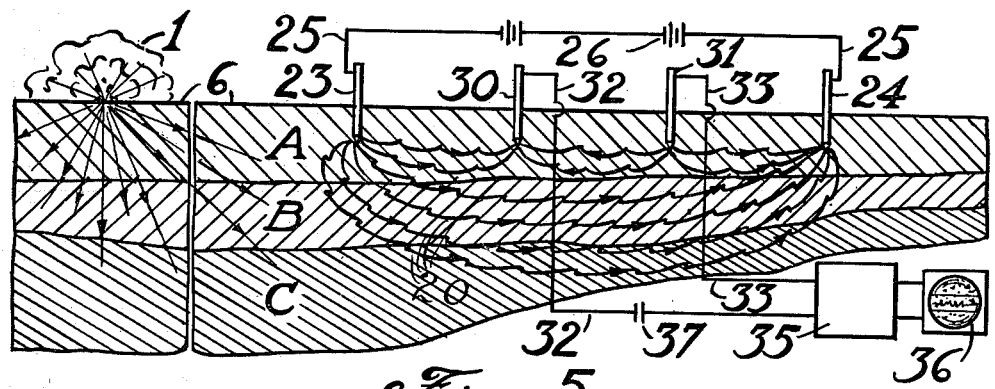
Fig. 5 is a diagrammatic view of a modified form of the invention.
Figure 6:
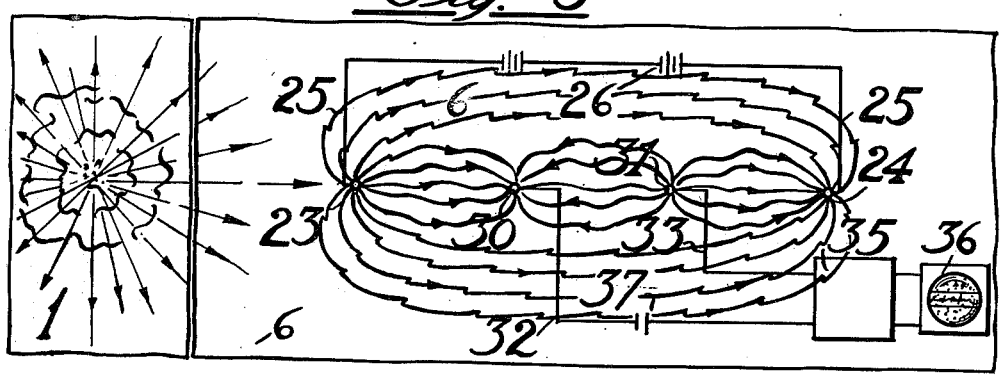
Fig. 6 is a top plan view of the apparatus illustrated in Fig. 5.

Referring particularly to Figs. 5 and 6, another means for utilizing the energy arriving simultaneously over a very great volume of the earth is illustrated. Reference numerals 23 and 24 designate electrodes which are driven into the ground and are connected by means of electrically conductive lines 25 to a battery 26. The distances between the electrodes 23 and 24 may be from a few feet to hundreds of feet.

Additional electrodes 30 and 31 are driven into the ground at any convenient points on a straight line connecting the electrodes 23 and 24. The electrodes 30 and 31 are connected through electrically conductive lines 32 and 33 respectively to an amplifier 35 and an oscillograph 36 through a condenser 37 in the line 32. The electrodes 23, 24, 30 and 31 may or may not be equidistantly spaced from each other.

In the operation of the device, the ground in the vicinity of the electrodes is caused to vibrate by an explosion or other shock. As a result, the electrical resistance of the ground is changed. This causes a change in the voltage drop across the electrodes 30 and 31, which change in voltage is impressed upon the amplifier 35, is magnified by the amplifier and is finally recorded by the oscillograph 36. The reflected waves arrive substantially in a vertical direction from below through the volume through which the electric currents are flowing and therefore modify or affect the electric current over the entire volume, thereby causing a large change in the voltage drop across electrodes 30 and 31. This is in contradistinction to the direct waves which progress virtually along the surface of the ground and cause little change in the voltage across the electrodes 30 and 31.

Figure 7:
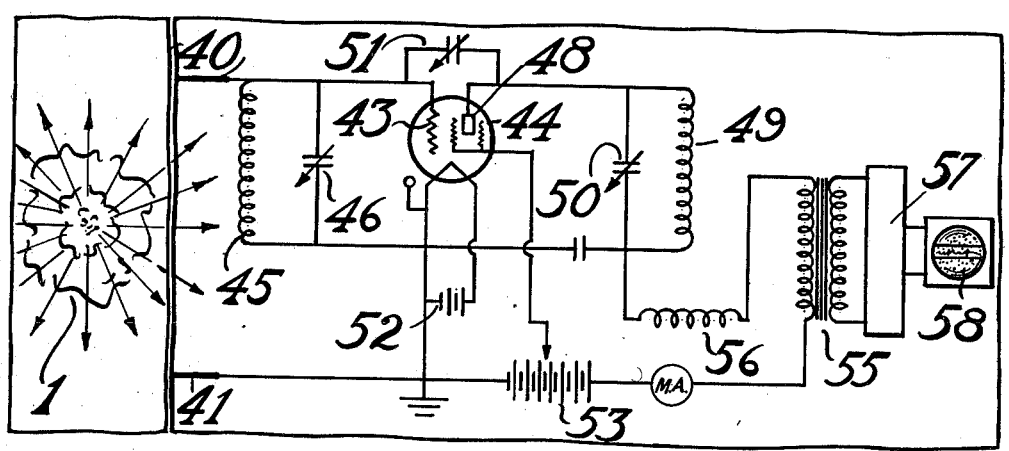
Fig. 7 is a diagrammatic view of still another form of the invention.

Referring particularly to Fig. 7, a modified form of the invention is illustrated in which electrically conductive wires 40 and 41 of convenient lengths are disposed upon the surface of or are buried beneath the surface of the ground extending approximately parallel to each other. The wires are electrically insulated from the ground. The wires 40 and 41 are spaced from each other suitable distances such as, for example, one foot. The wires 40 and 41 may be of any convenient length such as 25 feet or 100 feet long. The wires 40 and 41 are connected across the grid 43 of a vacuum tube 44 in parallel with a coil 45 and a variable condenser 46. This forms an oscillatory circuit, the frequency of which varies with variations of the electrical constants.

The complete circuit includes a plate 48 and inductance 49 and a variable condenser 50. A variable condenser 51 is disposed in a bridge between the grid and plate circuits. The batteries for operating the vacuum tube are indicated at 52 and 53. The tube circuit illustrated is finally connected to the primary of a transformer 55 through radio frequency choke 56. The secondary winding of the transformer 55 is connected to an amplifier 57 and an oscillograph 58.

The wires 40 and 41 extend substantially radially from the shotpoint 1 and are disposed parallel to a line connecting the instrument set-up with the shotpoint. A wave traveling along the surface of the ground in a direction parallel to the wires 40 and 41 gives no indication upon the oscillograph 58. A wave traveling in a direction perpendicular to the wires 40 and 41 does give an indication because such a wave arrives at the wires practically simultaneously along the whole length of the wires. Thus a direct wave gives no indication upon the oscillograph whereas a reflected wave does give an indication.

One of the wires can be insulated and the other wire bare of insulation with the bare wire grounded and some of the advantages of the invention will be retained.

By the constructions described arrangements are used which respond to waves arriving over large volumes of the ground simultaneously. The waves arriving over areas several hundred feet long, such as 200 feet or longer, are recorded. Thus the devices are adapted for the recording of reflections. The electrical current lines are substantially horizontal. Consequently the receiving station is more sensitive to waves arriving in a vertical direction than to direct, and surface waves. Therefore the receiving station is particularly sensitive to reflected waves. Two parallel wires may be used distributed in any configuration at a location removed from the center of disturbance and the changes in inductance, capacity, resistance and other electrical properties of the ground between and around and beneath alternate wires due to arrival of the seismic waves may be recorded.

Various changes may be made within the scope of the appended claims in which it is desired to claim all novelty inherent in the invention as broadly as the prior art permits.

We claim:

1. The method of geophysical exploration which comprises receiving over a continuous extended volume of the ground including subsurface strata wave energy arriving throughout the volume from a source of propagation of seismic waves, and obtaining an indication due to the effect of this wave energy on the electrical properties of the volume of ground.

2. The method of geophysical exploration, which comprises propagating seismic waves from a given source, receiving over a continuous volume of the ground including subsurface strata extending radially from the source wave energy arriving throughout the volume from the source, and obtaining an indication due to the effect of this wave energy on the electrical properties of the volume of ground.

3. The method of geophysical exploration, which comprises obtaining over a continuous extended volume of the earth an indication of the electric constants of the earth, receiving over the volume wave energy arriving throughout the volume from a source of propagation of seismic waves whereby said electric constants of the volume of earth are changed, and obtaining an indication of the change of the electrical constants.

4. The method of geophysical exploration which comprises passing an electric current through the ground between spaced electrodes, creating a seismic disturbance to change the electrical resistance of the ground, and recording the change in resistance.

5. The method of geophysical exploration, which comprises passing an electrical current through the ground between a plurality of spaced positive electrodes connected in parallel and a plurality of spaced negative electrodes connected in parallel, creating a seismic disturbance to change the electrical resistance of the ground, and recording the change in resistance.

6. The method of geophysical exploration, which comprises conducting the natural ground current through spaced positive electrodes connected in parallel and spaced negative electrodes connected in parallel, creating a seismic disturbance to change the natural ground current, and recording the change of current.

7. The method of geophysical exploration, which comprises passing an electric current through the ground from spaced electrodes, conducting the resulting ground current through additional spaced electrodes substantially aligned with the first mentioned electrodes, creating a seismic disturbance to change the electrical resistance of the ground whereby a change in voltage drop is caused across the additional electrodes, and recording the change in voltage.

8. The method of geophysical exploration, which comprises propagating seismic waves from a given source, disposing two parallel wires along the ground substantially radially from the source and at a point removed from the center of disturbance, and recording the changes in electrical properties of the ground due to the arrival of the seismic waves.

9. The method of geophysical exploration, which comprises propagating seismic waves from a given source, disposing a plurality of parallel wires along the ground substantially radially from the source and at a point removed from the center of the disturbance, and recording the changes in electrical properties of the ground between and around alternate wires, due to the arrival of the seismic waves.

10. The method of geophysical exploration, which comprises propagating seismic waves from a given source, disposing a plurality of insulated wires, each connected together along the ground, distributed in any configuration at a point removed from the center of disturbance, and recording the changes in inductance, capacity, resistance, and other electrical properties of the ground around the wires due to the arrival of the seismic waves.

11. In a system for geophysical exploration, means adapted to be disposed in an extended volume of the earth operative to receive wave energy arriving throughout the volume from a source of propagation of seismic waves, and indicating means operatively associated with the receiving means responsive to the seismic wave energy which has arrived over this extended volume.

12. The method of geophysical exploration, which comprises receiving over a plurality of extended volumes of the ground including subsurface strata wave energy arriving throughout the volumes from a source of propagation of seismic waves, the volumes being disposed at different distances from the source, and simultaneously obtaining indications due to the effect of this wave energy on the electrical properties of the volumes of the ground.

13. In a system for geophysical exploration, a source of propagation of seismic waves, means adapted to be disposed in an extended elongated volume of the earth radially of the source and operative to receive wave energy arriving throughout the volume from the source, and an indicating means operatively associated with the receiving means responsive to the seismic wave energy which has arrived over this extended volume.

14. In a system for geophysical exploration, electrical means adapted to be disposed in an extended volume of the earth responsive to changes in the electric constants of the earth over said volume, operative to receive wave energy arriving throughout the volume from a source of propagation of seismic waves which modify the electric constant of the earth, and an indicating means operatively associated with the receiving means responsive to the seismic wave energy which has arrived over this extended volume.

15. In a system for recording seismic disturbances, spaced electrodes in the ground spaced from a source of seismic waves, means for passing an electric current through the ground from the spaced electrodes, and means for recording variations in the current caused by the seismic waves.

16. In a system for recording seismic disturbances, a group of spaced electrodes in the ground connected in parallel, a second group of spaced electrodes in the ground connected in parallel, a transformer the primary of which is connected to the electrodes, an amplifier connected to the secondary of the transformer, and an oscillograph connected to the output leads of the amplifier.

17. In a system for recording seismic disturbances, spaced electrodes in the ground, means for passing an electric current through the ground between the electrodes, additional spaced electrodes in the ground substantially aligned with the first mentioned electrodes so that a seismic disturbance changes the electrical resistance of the ground whereby a change in voltage drop is caused across the additional electrodes, and an electric circuit connected to the additional electrodes including means for recording the drop.

18. In a system for recording seismic disturbances, spaced electrodes in the ground, means for passing an electric current through the ground between the electrodes, additional spaced electrodes in the ground between and substantially aligned with the first mentioned electrodes, so that a seismic disturbance changes the electrical resistance of the ground whereby a change in voltage drop is caused across the additional electrodes, and an electric circuit including a recorder connected to the additional electrodes for recording the drop in voltage.

19. In a system for recording seismic disturbances, a vacuum tube, parallel wires on the ground spaced and extending radially from the source and connected across the grid and filament of the oscillator vacuum tube, the plate current of which is changed by variations of the electrical properties of the ground between and around the wires caused by the arrival of seismic waves, suitable amplification, a transformer and oscillograph for recording the vibrations so produced.

20. In a system for geophysical exploration, a source of seismic waves, parallel wires buried beneath the surface of the ground spaced and extending radially from the source, means for recording the changes in electrical properties of the ground between and around the wires caused by the arrival of the seismic waves.

21. The method of geophysical exploration which comprises receiving through a volume of the ground the wave energy arriving through the volume from a source of propagation of seismic waves, and obtaining an indication due to the effect of this wave energy on the electrical properties of the volume.

22. The method of geophysical exploration which comprises passing an electric current through the ground between spaced electrodes, creating a seismic disturbance to change the electrical impedance of the ground, and recording the change in impedance.

23. Apparatus for geophysical exploration, which comprises means for passing an electric current through a given volume of the ground, means for creating seismic disturbances to change the electrical impedance of the volume of the ground, and means for recording the change in impedance.

24. The method of geophysical exploration, which comprises conducting the natural ground currents through the ground between spaced electrodes, creating a seismic disturbance to change the natural ground current, and recording the change of current.

25. Apparatus for geophysical exploration, which comprises spaced electrodes in the ground, means for conducting the natural ground current through the ground between the electrodes, means for creating a seismic disturbance to change the natural ground current, and means for recording the change of current.

26. In a system for recording seismic disturbances, spaced electrodes in the ground, means for passing an electric current through the ground between the electrodes, additional spaced electrodes in the ground substantially aligned with the first mentioned electrodes so that a seismic disturbance changes the electrical impedance of the ground whereby a change in voltage drop is caused across the additional electrodes, and an electric circuit connected to the additional electrodes including means for recording the drop.

27. In an apparatus for measuring changes in electrical impedance of the ground due to seismic disturbances, means adapted to be disposed over an extended volume of the ground responsive to changes in the electrical impedance of the ground over said volume operative to receive the wave energy arriving throughout the volume from a source of propagation of seismic waves which modify the electric impedance of the ground, and an electric circuit connected to the means and including a transformer, an amplifier and a recorder whereby changes in the electric impedance of the ground are recorded.

28. In an apparatus for measuring changes in electrical impedance of the ground due to seismic disturbances, spaced electrodes in the ground, an electric circuit connecting the electrodes including a source of electric energy and the primary of a transformer connected in series with the electrodes whereby lines of electric force pass between the electrodes through an extended volume of the ground and the amount of electric energy flowing through the volume is changed by the seismic disturbances, means connected to the secondary of the transformer for amplifying the change in current, and means for recording the amplified change.

LUDWIG W. BLAU.
LOUIS STATHAM.